Dec. 25, 1962 R. K. WELCH 3,070,233
FLUID FILTER ELEMENT
Filed Nov. 30, 1956

INVENTOR.
Russell K. Welch
BY
J. W. Lovett
ATTORNEY.

3,070,233
FLUID FILTER ELEMENT
Russell K. Welch, Davison, Mich., assignor to General Motors Corporation, Detroit, Mich., a corporation of Delaware
Filed Nov. 30, 1956, Ser. No. 625,474
2 Claims. (Cl. 210—484)

This invention relates to fluid filters and more particularly to filter elements for filtering fluids such as lubricating oils and transmission oils, each of these elements being suitable for insertion in a fluid flow or circulation system permitting entry of the fluid to be treated through one path into one or opposite ends of a filter element from which clarified fluid may be discharge through another path to the point or areas of use.

It is conventional in the filter art to employ a casing in a fluid circulation system of the type mentioned above and which is adapted to receive an original or a replaceable filter element commonly employing a perforated cylindrical shell and end plates confining filter material for treating the fluid as it passes through at least one of the end plates and through the perforations of the cylindrical casing. Such a filter element is disclosed in the United States Patent No. 2,014,105, granted September 10, 1935, in the name of C. H. Dooley. It is to this type of filter element employing a perforated cylindrical casing to which the present invention or improvement may be applied.

An object of the present invention is to provide an improved filter element in which a sheet of flexible filter material is employed to form a channel and which may be quickly and economically sealed to one or both ends of the casing by an operation undertaken outside the casing thereby making a reliable and adequate barrier between the unfiltered and the clarified fluid.

These and other objects of the invention will now be described in detail in the specification and then pointed out more particularly in the appended claims.

Figure 1:
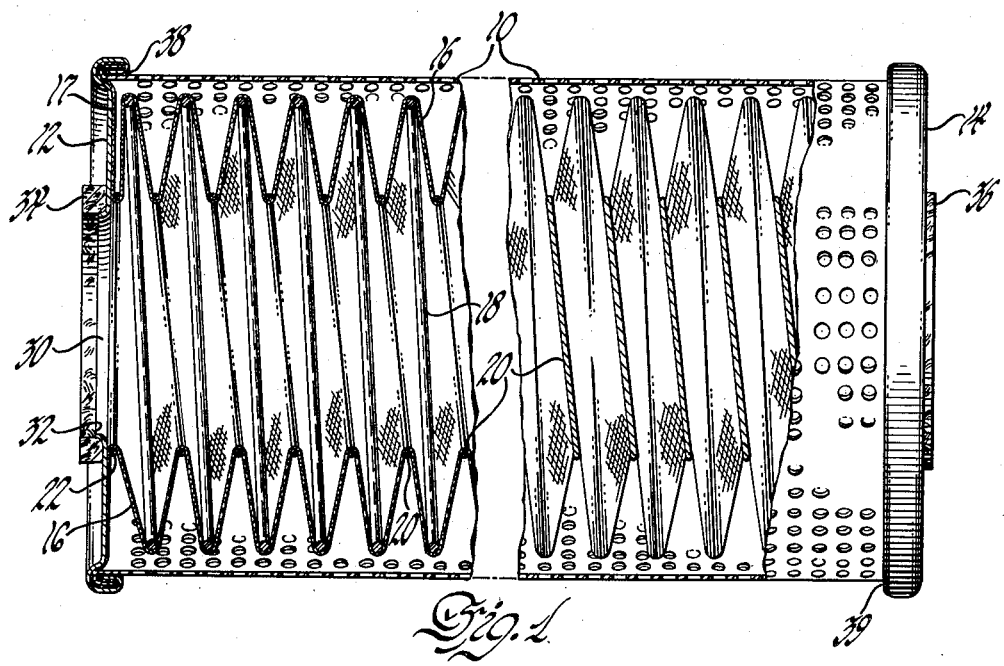
Figure 2:
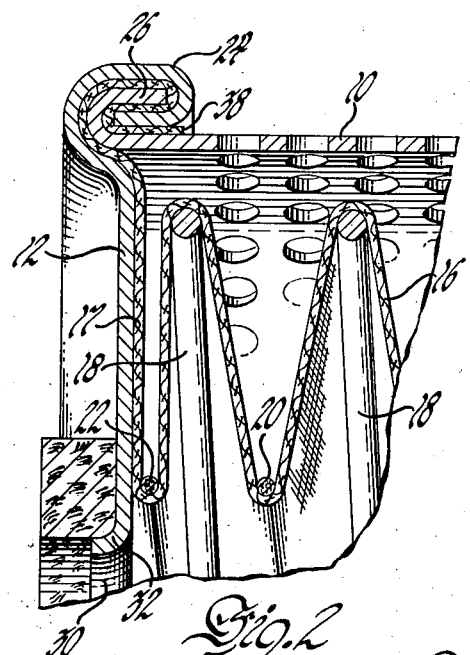

In the drawings:
FIG. 1 is a side view partially in section of a fluid filter element in which the present invention is embodied; and
FIG. 2 is an enlarged, sectional view of a portion of the filter element shown in FIG. 1.

In the drawings, a filter element is shown to comprise a perforated cylindrical casing 10 fitted with end plates 12 and 14. These end plates are similar and, for this reason, only the end plate 12 is described herein.

Confined within and spaced from the inner wall of the casing 10 is a filter material 16 in a form often referred to in the filtering art as "sock material." This material may be of synthetic fiber such as Orlon or Dacron and it is selected to be of proper mesh, weave or permeability to insure the proper degree of fineness in filtering for any given installation intended.

The sock material 16 is initially in the form of a cylinder made from sheet material and it is given its peculiar configuration, as shown in the drawings, by being held outwardly through the use of the convolutions of a helical spring or frame 18. The material 16 is retained taut within the spring convolutions by a cord 20 wrapped around the sock material and tied beyond the spring ends such as at 22. Each end of the wire forming the spring is bent inwardly (not shown) to preclude rupturing of the material 16.

The sock material at each end, and as shown clearly in the drawings at 17, is drawn tightly and radially outward and clinched or clamped within reverse bends or beads 24 and 26 formed on each end cap and the casing 10 respectively.

The end cap 12 is centrally apertured as at 30 and this aperture is bounded by an outwardly extending flange 32.

A sealing washer 34 is attached to the end plate 12 by means of an adhesive and is accurately positioned by the flange 32, as clearly shown in the drawings. The end plate 14 is supplied with a sealing gasket 36 similar to the gasket 34.

Heretofore in making helical sock type filters, a difficulty has been experienced in joining the sock material to the end plates to give a proper seal or reliable and effective barrier between the fluid entering the filter and the fluid leaving the filter. In the present instance the sock material is easily, quickly and tightly placed in its assemby by pulling the sock material radially to attain tension therein and then over and in contact with the casing 10 and then joining the end plate 12 to the casing 10 by rolling the metal edges, as shown. The forming of an effective and proper joint between the sock material and the walls of the filter element may be quickly done at both ends of the filter element and the quality of the work is easily perceived by exterior inspection of the finished filter element. There is no complicated procedure or inner construction to form the requisite seal of the sock material to one or both end plates.

In joining the parts in assembly, it has been found convenient to use a sleeve containing a rotatable mandrel. This mandrel is of an outside diameter to conform with the required inside diameter of the helical form of the filter material 16 and the sleeve may be of sufficient size to accommodate the insertion therein of a casing 10. In forming an assembly, a helical spring 18 is inserted over the mandrel and the sock material is drawn over the spring. One end portion of the sock material (with an excess extending from that end of the spring) is tied to the mandrel with the latter extending from the sleeve sufficiently for the purpose. The sock material is then twisted (often as much as 270 degrees) around the spring in order to take out any looseness in the fabric or flexible filter material after which the cord 20 is held radially extending from the mandrel. The latter is then rotated thereby rotating the spring and the sock with it. Sufficient tension is placed on the cord 20 so that the sock material is pulled in radially between the spring convolutions to conform with the diameter of the mandrel thereby determining the minimum inside diameter of an axial flow channel when the parts are eventually removed from the mandrel. When the cord is sufficiently wound that the other end of the spring is reached, the cord is tied about the sock material, as at 22. The casing 10 is then slipped over the helical sock material and, after removal of the parts from the mandrel as mentioned above, the end portions of the sock material are pulled radially and tightly outward to locate the helically formed material substantially coaxial with respect to the casing. These end portions are of such excess length or size that each may be pulled over the outside of one end of the casing 10 and the end caps 12 and 14 are crimped into position thereby firmly holding the inner parts of the filter element in their proper assembled positions with the sock material under tension. Subsequently, sock material protruding from the end plates is cut off as at 38 and 39.

Fluid entering through the opening 30 and perhaps also through the opening in the end plate 14 must pass through the socket material 16 and be clarified before it is withdrawn through the perforations of the casing 10. An end portion 17 of socket material definitely precludes any intermixing of impuirties in the untreated fluid with the filtered fluid. The fluid may also be directed in the reverse direction—i.e.—through the perforations of the casing 20 for filtering by means of the sock material 16 and be discharged from one or both ends of the filter element. The element may be used either way but is better suited to the outside-in direction flow.

One advantageous characteristic of this form of filter element as herein disclosed is that it may be utilized in fluid circulation systems in which the fluid pressure is high. Paper elements in other forms of filters would rupture—i.e.—would not be capable of withstanding the pressure. These spiral sock type filter elements as herein disclosed, however, are not limited to high pressure use or to particular flexible filter materials and, whether the fluid pressure is high or low, impurities cannot by-pass the filter material.

I claim:

1. A fluid filter element comprising a cylindrical casing, filtrate discharge openings in said casing, end plates partially closing the ends of said casing, central openings in said end plates, a helical frame coaxially arranged within said casing, a sheet of flexible material supported by said frame and being under tension in defining a channel leading from one of said central openings to the other, said flexible material having end portions extending radially with respect to said casing and contacting the inner faces of said end plates, and the peripheral margins of said end portions being clamped between said end plates and the casing to maintain said tension.

2. A fluid filter element comprising a cylindrical casing, perforations in said casing, end plates partially closing the ends of said casing, central openings in said end plates, a helical spring extending from one end of said casing to the other end coaxial with said casing, a tube of flexible filter material stretched over said spring and restricted in diameter between convolutions of said spring, means wrapped around said flexible material to cause said restriction and place said material under tension, said tube of flexible material defining a channel leading from one of said central openings to the other, end portions of said flexible material extending radially with respect to said casing and lying under tension and substantially parallel with said end plates, and peripheral marginal portions of said end portions being clamped between said end plates and the peripheral edges of said casing to form annular seals therewith and to maintain said tension.

References Cited in the file of this patent

UNITED STATES PATENTS

| | | |
|---|---|---|
| 1,810,965 | Hopkins | June 23, 1931 |
| 1,928,049 | Danills | Sept. 26, 1933 |
| 2,023,423 | Kleckner | Dec. 10, 1935 |
| 2,100,951 | Glass | Nov. 30, 1937 |
| 2,202,403 | Sandberg | May 28, 1940 |
| 2,587,693 | Burks et al. | Mar. 4, 1952 |
| 2,685,371 | Gretzinger | Aug. 3, 1954 |